United States Patent
Lunttila et al.

(10) Patent No.: US 12,294,554 B2
(45) Date of Patent: May 6, 2025

(54) PUCCH DESIGN FOR UNLICENSED BAND OPERATION AT MMWAVES

(71) Applicant: Nokia Technologies Oy, Espoo (FI)

(72) Inventors: Timo Lunttila, Espoo (FI); Esa Tiirola, Kempele (FI); Kari Hooli, Oulu (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 492 days.

(21) Appl. No.: 17/795,399

(22) PCT Filed: Feb. 2, 2021

(86) PCT No.: PCT/IB2021/050839
§ 371 (c)(1),
(2) Date: Jul. 26, 2022

(87) PCT Pub. No.: WO2021/165770
PCT Pub. Date: Aug. 26, 2021

(65) Prior Publication Data
US 2023/0055366 A1    Feb. 23, 2023

Related U.S. Application Data

(60) Provisional application No. 62/977,830, filed on Feb. 18, 2020.

(51) Int. Cl.
*H04L 5/00* (2006.01)
*H04L 27/00* (2006.01)
(Continued)

(52) U.S. Cl.
CPC .......... *H04L 5/0094* (2013.01); *H04L 5/0007* (2013.01); *H04L 5/0053* (2013.01);
(Continued)

(58) Field of Classification Search
CPC ............. H04L 5/0094; H04L 27/26025; H04L 5/0007; H04L 5/0053; H04L 27/0006; H04W 72/21
(Continued)

(56) References Cited

U.S. PATENT DOCUMENTS

2018/0220415 A1    8/2018 Yin et al.
2018/0368137 A1*  12/2018 Yin ...................... H04L 5/0091
(Continued)

FOREIGN PATENT DOCUMENTS

EP    3592082 A1    1/2020

OTHER PUBLICATIONS

"New SID: Study on supporting NR from 52.6GHz to 71 GHz", 3GPP TSG RAN Meeting #86, RP-193259, Agenda: 9.1.1, Intel Corporation, Dec. 9-12, 2019, 3 pages.
"3rd Generation Partnership Project; Technical Specification Group Radio Access Network; NR; Physical channels and modulation (Release 16)", 3GPP TS 38.211, V16.0.0, Dec. 2019, pp. 1-129.
(Continued)

*Primary Examiner* — Christopher R Crompton
(74) *Attorney, Agent, or Firm* — Robert P. Michal, Esq.; Carter, DeLuca & Farrell LLP

(57) ABSTRACT

In accordance with an example embodiment of the present invention, a method comprising: determining, by a user equipment of a communication network, information received from a communication network comprising a physical uplink control channel resource set indication and an indication of subcarrier spacing used for a physical uplink control channel; based on the information, determining at least one of a size or allocation of at least one physical uplink control channel resource associated with the physical uplink control channel resource set; and transmitting control information associated with the physical uplink control channel to the communication network using at least the determined at least one of size or allocation of the at least one physical uplink control channel resource.

15 Claims, 10 Drawing Sheets

(51) Int. Cl.
  *H04L 27/26* (2006.01)
  *H04W 72/21* (2023.01)
(52) U.S. Cl.
  CPC .... *H04L 27/0006* (2013.01); *H04L 27/26025* (2021.01); *H04W 72/21* (2023.01)
(58) Field of Classification Search
  USPC .......................................... 370/329
  See application file for complete search history.

(56) References Cited

U.S. PATENT DOCUMENTS

2019/0098580 A1* 3/2019 Babaei ................. H04W 72/56
2019/0124647 A1* 4/2019 Li ........................ H04L 1/1825

OTHER PUBLICATIONS

"3rd Generation Partnership Project; Technical Specification Group Radio Access Network; Study on New Radio access technology; 60 GHz unlicensed spectrum (Release 14)", 3GPP TR 38.805, V14.0.0, Mar. 2017, pp. 1-17.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.2.0, Dec. 2019, pp. 1-157.

"3rd Generation Partnership Project; Technical Specification Group Radio Access Network; NR; Physical layer procedures for control (Release 16)", 3GPP TS 38.213, V16.0.0, Dec. 2019, pp. 1-146.

International Search Report and Written Opinion received for corresponding Patent Cooperation Treaty Application No. PCT/IB2021/050839, dated Apr. 1, 2021, 13 pages.

* cited by examiner

| 110 PUCCH resource size (MHz) | 120 Number of PRBs for different PUCCH numerologies (kHz) | | | | | |
|---|---|---|---|---|---|---|
| | 120 | 240 | 480 | 960 | 1920 | 3840 |
| 92,16 | 64 | 32 | 16 | 8 | 4 | 2 |
| 46,08 | 32 | 16 | 8 | 4 | 2 | 1 |
| 23,04 | 16 | 8 | 4 | 2 | 1 | 1/2 |
| 11,52 | 8 | 4 | 2 | 1 | 1 | 1/4 |
| 5,76 | 4 | 2 | 1 | 1 | 1 | 1/8 |
| 2,88 | 2 | 1 | 1 | 1 | 1 | 1/16 |
| 1,44 | 1 | 1 | 1 | 1 | 1 | 1/32 |

FIG. 1

| 210 Indication | 220 PUCCH resource size (MHz) |
|---|---|
| 7 | 92,16 |
| 6 | 46,08 |
| 5 | 23,04 |
| 4 | 11,52 |
| 3 | 5,76 |
| 2 | 2,88 |
| 1 | 1,44 |
| 0 | reserved |

FIG. 2

| 310 PUCCH resource size indication | | Number of PRBs and symbols for different PUCCH numerologies (kHz) 320 | | | | | 335 |
|---|---|---|---|---|---|---|---|
| | | 120 | 240 | 480 | 960 | 1920 | 3840 |
| 7 | RBs | 32 | 16 | 8 | 4 | 2 | 1 |
| | symbols | 8 | 8 | 8 | 8 | 8 | 8 |
| 6 | RBs | 16 | 8 | 4 | 2 | 1 | 1 |
| | symbols | 8 | 8 | 8 | 8 | 8 | 4 |
| 5 | RBs | 8 | 4 | 2 | 1 | 1 | 1/2 |
| | symbols | 8 | 8 | 8 | 8 | 4 | |
| 4 | RBs | 4 | 2 | 1 | 1 | 1 | 1/4 |
| | symbols | 8 | 8 | 8 | 4 | 4 | |
| 3 | RBs | 2 | 1 | 1 | 1 | 1 | 1/8 |
| | symbols | 8 | 8 | 4 | 4 | 4 | |
| 2 | RBs | 1 | 1 | 1 | 1 | 1 | 1/16 |
| | symbols | 8 | 4 | 4 | 4 | 4 | |
| 1 | RBs | 1 | 1 | 1 | 1 | 1 | 1/32 |
| | symbols | 4 | 4 | 4 | 4 | 4 | |

FIG. 3

| 410 min. peak EIRP of UE | | 420 Number of PRBs and slots for different PUCCH numerologies (kHz) | | | | | |
|---|---|---|---|---|---|---|---|
| | | 120 | 240 | 480 | 960 | 1920 | 3840 |
| 29 dBm | RBs | 12 | 6 | 3 | 2 | 1 | 1 |
| | slots | 1 | 1 | 1 | 1 | 1 | 1 |
| 23 dBm | RBs | 12 | 6 | 3 | 2 | 1 | 1 |
| | slots | 2 | 2 | 2 | 2 | 2 | 2 |

FIG. 4

| 510 $\mu$ | 520 subcarrier spacing $\Delta f = 2^{\mu} \cdot 15[kHz]$ | 530 Cyclic prefix |
|---|---|---|
| 0 | 15 | Normal |
| 1 | 30 | Normal |
| 2 | 50 | Normal, Extended |
| 3 | 120 | Normal |
| 4 | 240 | Normal |

FIG. 5A

| 531 $\mu$ | 532 Subcarrier spacing [kHz] | 533 Max BW with 4k FFT [MHz] | 534 Slot length [µs] | 536 Symbol length w/o CP [µs] | 537 Nominal CP length [ns] |
|---|---|---|---|---|---|
| 0 | 15 | 50 | 1000 | 66.67 | 4688 |
| 1 | 30 | 100 | 500 | 33.33 | 2343 |
| 2 | 60 | 200 | 250 | 16.67 | 1172 |
| 3 | 120 | 400 | 125 | 8.33 | 586 |
| 4 | 240 | 800 | 62.5 | 4.17 | 293 |
| 5 | 480 | 1600 | 31.25 | 2.08 | 147 |
| 6 | 960 | 3200 | 15.625 | 1.04 | 73 |
| 7 | 1920 | 6400 | 7.8125 | 0.52 | 37 |

530 FR1: μ=0,1
535 FR2: μ=2,3
540 >52.6 GHz: μ=4,5,6,7

FIG. 5B

| | 541 Frequency Band | 542 Power / Magnetic Field | 543 Spectrum access and mitigation requirements | 544 Modulation / maximum occupied bandwidth | ECC/ERC deliverable | 545 Notes |
|---|---|---|---|---|---|---|
| c1 | 57-71 GHz | 40 dBm e.i.r.p., 23 dBm/MHz e.i.r.p. density | Adequate spectrum sharing mechanism shall be implemented by the equipment | Not specified | | Fixed outdoor installations are not allowed |
| c2 | 57-71 GHz | 40 dBm e.i.r.p., 23 dBm/MHz e.i.r.p. density and maximum transmit power of 27 dBm at the antenna port or ports | Adequate spectrum sharing mechanism shall be implemented | Not specified | ECC Report 288 | |
| c3 | 57-71 GHz | 55 dBm e.i.r.p., 38 dBm/MHz e.i.r.p. density and transmit antenna gain ≥ 30 dBi | Adequate spectrum sharing mechanism shall be implemented | Not specified | ECC Report 288 | Applies only to fixed outdoor installations |

FIG. 5C

| UE power class | Max Transmit Power (dBm) | Min peak EIRP (dBm) | UE spherical coverage |
|---|---|---|---|
| 1 (fixed wireless access) | 35 | 38-40 | 30-32 at 85%-tile of CDF |
| 2 (vehicular UE) | 23 | 29 | 18 at 60-tile of CDF |
| 3 (handheld UE) | 23 | 20.6 - 22.4 | 8- 11.5 at 50-tile of CDF |
| 4 (high-power non-handheld UE) | 23 | 31-34 | 19-25-tile of CDF |

FIG. 5D

| Index (570) | PUCCH format (572) | First symbol (574) | Number of symbols (576) | PRB offset $RB_{BWP}^{offset}$ (578) | Set of initial CS indexes (579) |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

FIG. 5E

| 580 Index | 581 PUCCH format | 582 First symbol(s) | 583 Number of symbols | 584 interlace offset $RB_{BWP}^{offset}$ | 585 Set of initial CS indexes | 586 Comment | 587 Available Resources |
|---|---|---|---|---|---|---|---|
| 0 | 0 | {12, 9} | 2 | 0 | {0, 3} | Add 2nd resource in TD at symbol 9 | 16 |
| 1 | 0 | {12, 9} | 2 | 0 | {0, 4, 8} | Add 2nd resource in TD at symbol 9 | 16 |
| 2 | 0 | 12 | 2 | 3 | {0, 4, 8} | | N/A |
| 3 | 1 | 10 | 4 | 0 | {0, 6} | Add extra OCC | 16 |
| 4 | 1 | 10 | 4 | 0 | {0, 3, 6, 9} | | 16 |
| 5 | 1 | 10 | 4 | 2 | {0, 3, 6, 9} | | 16 |
| 6 | 1 | 10 | 4 | 4 | {0, 3, 6, 9} | | 16 |
| 7 | 1 | 4 | 10 | 0 | {0, 6} | Add extra OCC | 16 |
| 8 | 1 | 4 | 10 | 0 | {0, 3, 6, 9} | | 16 |
| 9 | 1 | 4 | 10 | 2 | {0, 3, 6, 9} | | 16 |
| 10 | 1 | 4 | 10 | 4 | {0, 3, 6, 9} | | 16 |
| 11 | 1 | 0 | 14 | 0 | {0, 6} | Add extra OCC | 16 |
| 12 | 1 | 0 | 14 | 0 | {0, 3, 6, 9} | | 16 |
| 13 | 1 | 0 | 14 | 2 | {0, 3, 6, 9} | | 16 |
| 14 | 1 | 0 | 14 | 4 | {0, 3, 6, 9} | | 16 |
| 15 | 1 | 0 | 14 | $[N_{BWP}^{size}/4]$ | {0, 3, 6, 9} | not used | N/A |

FIG. 5F

PUCCH DESIGN FOR UNLICENSED BAND OPERATION AT MMWAVES

RELATED APPLICATION

This application claims priority to PCT Application No. PCT/IB2021/050839, filed on Feb. 2, 2021, which claims priority to U.S. Provisional Application No. 62/977,830, filed on Feb. 18, 2020, each of which is incorporated herein by reference in its entirety.

TECHNICAL FIELD

The teachings in accordance with the exemplary embodiments of this invention relate generally to facilitating PUCCH structures for coverage in all relevant deployment scenarios and, more specifically, relate to facilitating sufficient PUCCH structure for coverage in all relevant deployment scenarios by taking into account at least varying region and scenario dependent properties such as maximum TX power, EIRP, and PSD.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  3GPP $3^{rd}$ Generation Partnership Project
  BW BandWidth
  BWP BandWidth Part
  CCE Control Channel Element
  CEPT European Conference of Postal and Telecommunications Administrations
  COT Channel Occupancy Time
  CP Cyclic Prefix
  DFT-S-OFDMA Discrete Fourier Transform-Spread OFDMA
  DL Downlink
  DMRS DeModulation Reference Signal
  EIRP Equivalent Isotropic Radiated Power
  FFT Fast Fourier Transform
  LBT Listen Before Talk
  LTE Long Term Evolution (4G)
  NR New Radio (5G)
  NR-U New Radio Unlicensed
  OFDMA Orthogonal Frequency Division Multiple Access
  PDCCH Physical Downlink Control Channel
  PDSCH Physical Downlink Shared Channel
  PRB Physical Resource Block
  PRI PUCCH Resource Indicator
  PSD Power Spectral Density
  PUCCH Physical Uplink Control Channel
  PUSCH Physical Uplink Shared Channel
  RB Resource Block
  RMSI Remaining Minimum System Information
  RRC Radio Resource Control
  SCS Subcarrier Spacing
  UCI Uplink Control Information
  UE User Equipment
  UL Uplink At the time of this application, existing radio access technology (RAT) wireless communication systems as well as newer 5G and new radio (NR) systems are being developed to diversely cover a wide range to provide such a communication services such as audio communication services, video communication services, data communication services, and the like. The wireless communication uses multiple access system capable of supporting communications with multiple users by sharing available system resources (e.g., bandwidth, transmit power, etc.).

Standards bodies at the time of this application are discussing new technology improvements for communication devices using these existing and newer RAT systems to have higher communication capacities and be faster. Moreover, these improvements being discussed include communication system design improvements supporting UE services and UEs sensitivities to reliability and latency.

Example embodiments of the invention work to define and build upon at least some of these improvements.

SUMMARY

Various aspects of examples of the invention are set out in the claims.

According to a first aspect of the present invention, a method comprising: determining, by a user equipment of a communication network, information received from a communication network comprising a physical uplink control channel resource set indication and an indication of subcarrier spacing used for a physical uplink control channel; based on the information, determining at least one of a size or allocation of at least one physical uplink control channel resource associated with the physical uplink control channel resource set; and transmitting control information associated with the physical uplink control channel to the communication network using at least the determined at least one of size or allocation of the at least one physical uplink control channel resource.

According to a second aspect of the present invention, an apparatus comprising: at least one processor; and at least one memory including computer program code, wherein the at least one memory and the computer program code are configured, with the at least one processor, to cause the apparatus to at least: determine information received from a communication network comprising a physical uplink control channel resource set indication and an indication of subcarrier spacing used for a physical uplink control channel; based on the information, determine at least one of a size or allocation of at least one physical uplink control channel resource associated with the physical uplink control channel resource set; and transmit control information associated with the physical uplink control channel to the communication network using at least the determined at least one of size or allocation of the at least one physical uplink control channel resource.

According to a third aspect of the present invention, A non-transitory computer storage medium encoded with a computer program, the program comprising instructions that when executed by one or more computers cause the one or more computers to perform operations comprising: determining, by a user equipment of a communication network, information received from a communication network comprising a physical uplink control channel resource set indication and an indication of subcarrier spacing used for a physical uplink control channel; based on the information, determining at least one of a size or allocation of at least one physical uplink control channel resource associated with the physical uplink control channel resource set; and transmitting control information associated with the physical uplink control channel to the communication network using at least the determined at least one of size or allocation of the at least one physical uplink control channel resource.

According to a fourth aspect of the present invention, a method comprising: determining information comprising a physical uplink control channel resource set indication and an indication of subcarrier spacing used for a physical uplink control channel; transmitting the information to a user equipment; based on the information, determining at least one of a size or allocation of at least one physical uplink control channel resource associated with the physical uplink control channel resource set; and receiving control information associated with the physical uplink control channel using at least the determined at least one of size or allocation of the at least one physical uplink control channel resource.

According to a fifth aspect of the present invention, an apparatus comprising: at least one processor; and at least one memory including computer program code, wherein the at least one memory and the computer program code are configured, with the at least one processor, to cause the apparatus to at least: determine information comprising a physical uplink control channel resource set indication and an indication of subcarrier spacing used for a physical uplink control channel; transmit the information to a user equipment; based on the information, determine at least one of a size or allocation of at least one physical uplink control channel resource associated with the physical uplink control channel resource set; and receive control information associated with the physical uplink control channel using at least the determined at least one of size or allocation of the at least one physical uplink control channel resource.

According to a sixth aspect of the present invention, A non-transitory computer storage medium encoded with a computer program, the program comprising instructions that when executed by one or more computers cause the one or more computers to perform operations comprising: determining information comprising a physical uplink control channel resource set indication and an indication of subcarrier spacing used for a physical uplink control channel; transmitting the information to a user equipment; based on the information, determining at least one of a size or allocation of at least one physical uplink control channel resource associated with the physical uplink control channel resource set; and receiving control information associated with the physical uplink control channel using at least the determined at least one of size or allocation of the at least one physical uplink control channel resource.

According to a seventh aspect of the present invention, an apparatus comprising: means for determining information received from a communication network comprising a physical uplink control channel resource set indication and an indication of subcarrier spacing used for a physical uplink control channel; based on the information, means for determining at least one of a size or allocation of at least one physical uplink control channel resource associated with the physical uplink control channel resource set; and means for transmitting control information associated with the physical uplink control channel to the communication network using at least the determined at least one of size or allocation of the at least one physical uplink control channel resource.

According to an eighth aspect of the present invention, an apparatus comprising: means for determining information comprising a physical uplink control channel resource set indication and an indication of subcarrier spacing used for a physical uplink control channel; means for transmitting the information to a user equipment; based on the information, means for determining at least one of a size or allocation of at least one physical uplink control channel resource associated with the physical uplink control channel resource set; and means for receiving control information associated with the physical uplink control channel using at least the determined at least one of size or allocation of the at least one physical uplink control channel resource.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1 shows a number of PRBs for different combinations of PUCCH numerology and PUCCH resource size;

FIG. 2 shows an example of PUCCH resource size indication using explicit signaling (3 bits);

FIG. 3 shows a Time-first Frequency-second scaling for entry 4 in a Table;

FIG. 4 shows Frequency first time second scaling for entry 14 in a Table;

FIG. 5A shows a Table of supported transmission numerologies;

FIG. 5B shows a Table of numerology candidates for above 52.6 GHz scenarios;

FIG. 5C shows a Table of draft informative parameters recommended for Wideband Data Transmission Systems considered by CEPT;

FIG. 5D shows a Table summarizing certain 3GPP NR requirements for UE maximum output power on FR2;

FIG. 5E shows PUCCH resource sets before dedicated PUCCH resource configuration;

FIG. 5F shows a Table of PUCCH resource sets before dedicated PUCCH configuration in a standard version of NR-Unlicensed;

DETAILED DESCRIPTION

Figure 6:
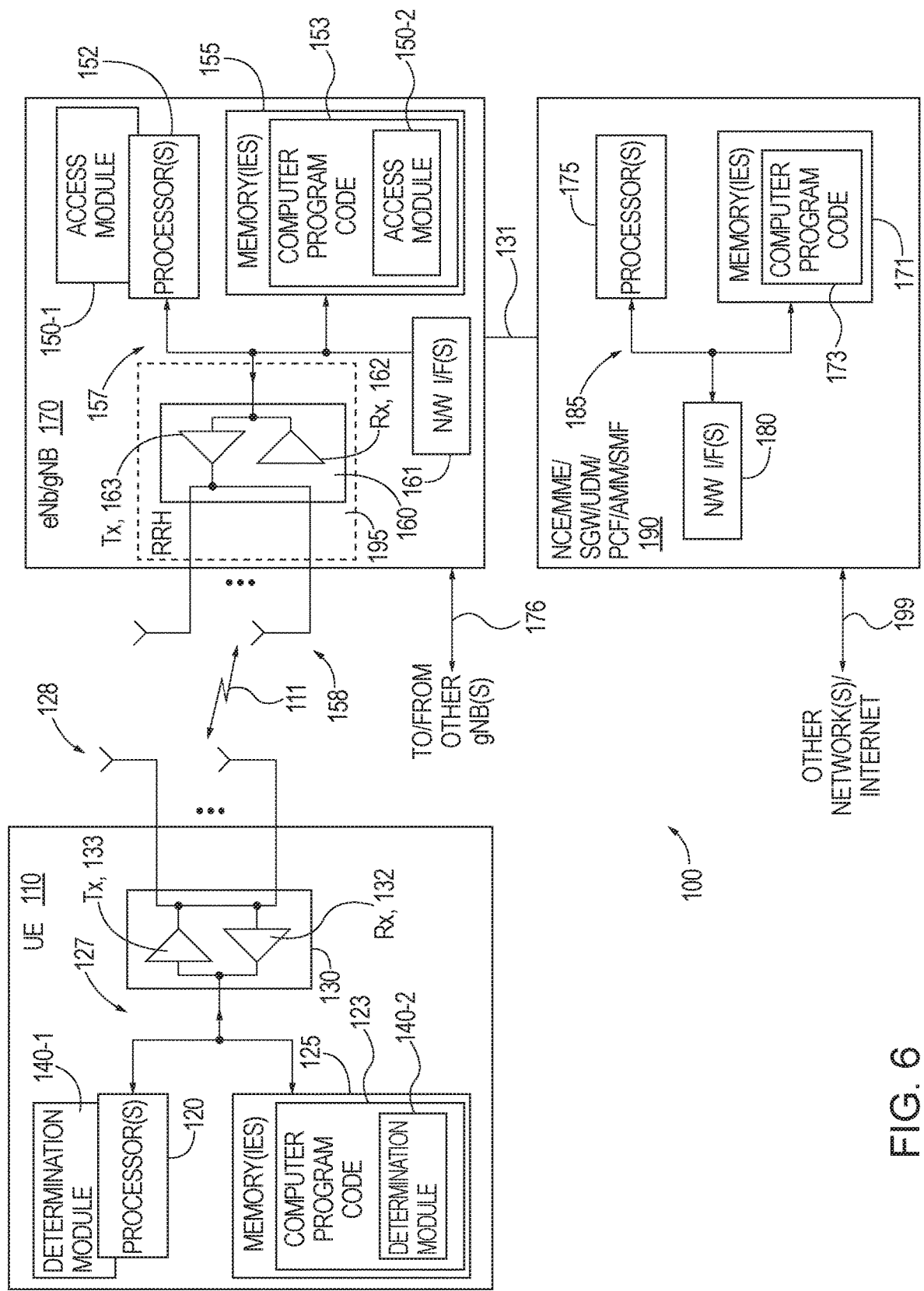
FIG. 6 shows shows a high level block diagram of various devices used in carrying out various aspects of the invention.

In this invention, there is proposed embodiments of the invention for facilitating sufficient PUCCH structure for coverage in all relevant deployment scenarios by taking into account at least varying region and scenario dependent properties such as maximum TX power, EIRP, and PSD.

Example embodiments of the invention are related to 3GPP New Radio (NR) physical layer design. More specifically, there is a focus on UL control signaling support for systems operating in unlicensed spectrum at mmWave bands with potentially a large subcarrier spacing such as 960 kHz SCS.

Example embodiments of the invention relate to where standards at the time of this application are performing:

Studies of required changes to NR using existing DL/UL NR waveform to support operation between 52.6 GHz and 71 GHz:

Studies of applicable numerology including subcarrier spacing, channel BW (including maximum BW), and their impact to FR2 physical layer design to support system functionality considering practical RF impairments, and Studies identifying potential critical problems to physical signal/channels, if any;

Study of channel access mechanism, considering potential interference to/from other nodes, assuming beam-based operation, in order to comply with the regulatory requirements applicable to unlicensed spectrum for frequencies between 52.6 GHz and 71 GHz:

Note: It is clarified that potential interference impact, if identified, may require interference mitigation solutions as part of channel access mechanism.

It is noted that the study language as underlined above may be particular to certain example embodiments of the invention.

NR Numerology & Time-Frequency Scaling

Support for multiple numerologies (that is, multiple sub-carrier spacings) is one of the basic features in NR. Parameters from standards at the time of this application show supported transmission numerologies.

In this regard it is well known that larger subcarrier spacing leads to:

a larger carrier bandwidth for a given FFT size, smaller symbol and slot duration and potentially lower latency, reduced sensitivity to phase noise, and reduced CP length (for a given CP overhead).

FIG. 5A shows a Table of supported transmission numerologies. As shown in column 510 of FIG. 5A there is a μ representing an index of the sub-carrier spacing, in column 520 of FIG. 5A there is shown subcarrier spacing, and as shown in column 530 of FIG. 5A there is shown a type of a cyclic prefix. Cyclic prefix and sub-carrier spacing are often referred as numerology.

Parameters from standards at the time of this application utilize time-frequency scaling with regards to LTE (where SCS=15 kHz) such that:

Scaling is characterized by a scaling factor $2^\mu$, and

Scaling decreases the time domain properties (such as slot/OFDM symbol/CP length) by factor of $2^\mu$, and increases the frequency domain properties (such as subcarrier spacing and PRB size in frequency) by factor of $2^\mu$.

Support for Wider BW & Phase Noise Mitigation

Parameters from standards at the time of this application support maximum BWP size of 275 PRBs. This means that the maximum BWP size according to current standards at the time of this application is 396 MHz, assuming a subcarrier spacing of 120 kHz and 12 subcarriers per each PRB (0.12 MHz*12*275). This is not enough for scenarios at above 52.6 GHz where aggregated system bandwidth can be as high as 12 GHz. In addition, phase noise will also be increased. Larger subcarrier spacing's need to be introduced to tackle phase noise, and to provide larger carrier bandwidth with reasonable FFT size.

FIG. 5B shows a Table of numerology candidates 540 for above 52.6 GHz scenarios together with numerologies 530 for below 6 GHz scenarios (also known as frequency range 1, FR1) and with numerologies 535 for scenarios between 24.25 GHz and 52.6 GHz (also known as frequency range 2, FR2) as supported by the standards at the time of this application.

At least the operations discussed above can be achieved by extending the numerology scaling framework defined in current standards at the time of this application to support additional values for μ (that is, values larger than 3) e.g. according to the table of FIG. 5B. For example by:

$2^\mu$ scaling of subcarrier spacing,

IFFT/FFT block length $2^{-\mu}$ and/or

Clock rate $2^\mu$ related to LTE

Regulations Related to Unlicensed Spectrum

There are wide global unlicensed bands available on the range of 57-71 GHz, making the unlicensed operation at mmWave interesting option for NR future development.

FIG. 5C shows a Table of draft informative parameters recommended for Wideband Data Transmission Systems considered by CEPT. As shown in column 541 of FIG. 5C there is shown a Frequency Band, as shown in column 542 of FIG. 5C a Power/Magnetic Field, in column 543 of FIG. 5C there is shown Spectrum access and Mitigation requirements, as shown in column 544 there is shown Modulation/maximum occupied bandwidth, and as shown in column 545 there are Notes.

It can be noted that there are significant differences in the required spectrum access mechanisms (targeting at fair spectrum use among different radio access technologies on the same shared unlicensed spectrum), allowed transmit power, EIRP, and power spectral density (PSD), varying from one geographical region to another, as well as depending on the type of the equipment and the installation (e.g. fixed or mobile, indoor or outdoor).

For example, European CEPT categories c1, c2, c3 for wideband data transmission systems have significant differences on the maximum transmit EIRP and transmit power as well as on allowed installations. CEPT category c2 (FIG. 5C Table) allows for up to 40 dBm EIRP with PSD of 23 dBm/MHz. Category c2 may be of special interest for NR-U, as fixed outdoor installations like gNB are allowed (contrary to c1), but c2 is not limited to the fixed outdoor installations only as the category c3, which could be used for example for outdoor backhauling or relaying. Additionally, non-specific short radio devices with 20 dBm maximum transmit EIRP, 10 dBm maximum transmit power, and PSD of 13 dBm/MHz are allowed on 57-64 GHz band.

There is no PSD limit in USA or Canada, but maximum EIRP is limited to 40 dBm in indoor installations and to 82 dBm with at least 51 dBi antenna gain in point-to-point outdoor installations. On the other hand, e.g. South Korean regulation supports maximum transmit power of 27 dBm and maximum EIRP of 43 dBm with PSD of only 13 dBm/MHz. Additionally, maximum transmit power is limited to 20 dBm in case of omni-directional antenna. Maximum EIRP of 57 dBm is allowed for point-to-point communications.

NR Standard Requirements for UE Transmission Power

3GPP NR provides requirements on UE maximum output or transmit power for various UE power classes as summarized in the Table of FIG. 5D for frequency range (FR) 2.

FIG. 5D shows a Table summarizing certain 3GPP NR requirements for UE maximum output power on frequency range 2. As shown in column 550 of FIG. 5D there is a UE power class, as shown in column 555 of FIG. 5D there is a Maximum Transmit Power in dBm, as shown in column 560 of FIG. 5D there is a Minimum peak EIRP in dBm, and as shown in column 565 of FIG. 5D there is a UE spherical coverage.

The requirements include the maximum transmit power allowed for UE, the minimum requirement for UE's peak EIRP, and the UE spherical coverage. The numbers in this table of FIG. 5D are taken from standards parameters at the time of this application. The required EIRP values vary across the operating bands of frequency range 2, and the range of the EIRP values is shown.

For the UE spherical coverage, the UE maximum radiated power is measured over the full sphere around the UE and cumulative distribution function of measured EIRP values is created. UE spherical coverage gives the EIRP value that the UE shall at least radiate at the given percentile of the measured CDF.

PUCCH Resources Before Dedicated RRC Configuration

In standards at the time of this application, for HARQ-ACK feedback:
  the UE selects PUCCH resource set based on the number of UCI bits,
  next the UE selects the PUCCH resource (including PUCCH format) within the selected PUCCH resource set based on a PUCCH resource indicator in the DCI,
  then the UE will determine the minimum number of PRBs needed to get the code rate for the number of UCI bits a configured maximum code rate. This applies only for PUCCH Format (PF) 2 & Format 3 as PUCCH Format 1, PUCCH Format 2, and PUCCH Format flare fixed to 1 PRB,
  In other words, the PUCCH resource configuration gives the maximum number of PRBs of a resource, and the actual number of PRBs used is determined based on UCI payload size and the maximum allowed code rate
  Contents of UCI can also include Scheduling Request (SR), or channel state information (CSI) signaling. Also other UCI types may be introduced.

When a UE does not yet have dedicated PUCCH resource configuration (e.g. during initial access procedure), the procedure is simpler as there is only a single PUCCH resource set allocated, the UCI payload is fixed (to 1 bit), and PUCCH resources are either of format 0 or format 1 in a given cell. The UE selects the PUCCH resource based on PRI (and the first CCE index of the DCI scheduling the PDSCH for which the HARQ-ACK is reported). The PUCCH resource set is selected from a fixed table (Table 9.2.1-1 in TS 38.213 for NR Release 15 as shown in FIG. 5E) with parameter "PUCCH-Resource-Common," signaled in System Information Block 1. A single PUCCH resource set (corresponding to a single index in Table 9.2.1-1 in TS 38.213) consists of a single PUCCH format and a duration (number of symbols)—and all resources use 1 PRB (in R15) or one interlace (in NR-Unlicensed introduced in R16 when interlaced resource allocation is configured).

In the licensed band NR design for standards at the time of this application, during initial access the PUCCH bandwidth is always 1 PRB. PUCCH formats 0 & 1 are used, with the PUCCH duration of either 2, 4, 10, or 14 symbols, as shown in FIG. 5E and as in standards at the time of this application. The gNB broadcasts the Index in the table in system information, and all UEs in the cell follow the same configuration.

FIG. 5E shows PUCCH resource sets before dedicated PUCCH resource configuration. As shown in FIG. 5E there is an Index 570, a PUCCH format 572, a First PUCCH Symbol 574, a Number of PUCCH Symbols 576, PRB Offset 578, and a set of initial cyclic shift Indexes 579.

In standards considerations at the time of this application for NR-Unlicensed, targeting 5 and 6 GHz unlicensed spectrum, the PSD is limited to 10 or 11 dBm/MHz. To avoid degradation in PUCCH coverage, new PUCCH formats were introduced, supporting interlaced allocation of 10 PRBs. The Table of FIG. 5F shows the configuration options for interlaced PUCCH upon initial access for NR-Unlicensed standards considerations at the time of this application. Some differences compared to current standards implementations can be shown with bolding as herein.

FIG. 5F shows a Table of PUCCH resource sets before dedicated PUCCH configuration in NR-Unlicensed when interlaced allocation is configured. As shown in FIG. 5F there is an Index 580, a PUCCH format 581, a First PUCCH Symbol 582, a Number of PUCCH Symbols 583, Interlace Offset 584 in resource blocks, initial cyclic shift Indexes set 585, Comment 586, and Available Resources 587.

Some key issues addressed in accordance with example embodiments of the invention as disclosed herein include a definition of a PUCCH structure, facilitating sufficient coverage in all relevant deployment scenarios with subcarrier spacing of 120 kHz and above, taking into account varying region and scenario dependent properties such as maximum transmit power, EIRP, and PSD. One focus in accordance with example embodiments of the invention as disclosed herein is especially on PUCCH transmissions during initial access, i.e. before the UE has received the UE-specific PUCCH configuration via dedicated RRC signaling.

An issue is that standards consideration designs at the time of this application are seen to be suboptimal in the unlicensed mmWave scenarios, where due to the high carrier frequency and large subcarrier spacing the PUCCH coverage is significantly restricted, and strict and varying limitations on PSD may cause the PUCCH to become the bottleneck in terms of system coverage.

For example, at least one standards based solution at the time of this application is relied on PRB-interlaced transmissions which can lead into unnecessary fragmentation of spectrum, increased implementation complexity, as well as increased Cubic Metric (CM) and/or peak-to-average-power ratio (PAPR). Furthermore, since the PDS limit is defined per MHz, and the subcarrier spacing (e.g. 960 kHz) or the bandwidth of a PRB (at least 1.44 MHz for 120 kHz SCS) is comparable to, or larger than 1 MHz, interlaced transmission does not help in increasing EIRP in a resource efficient manner. Thus interlace, and particularly PRB-interlaced design (as in a release at the time of this application) is clearly not suitable as coverage enhancement in 60 GHz spectrum.

As discussed herein, the standards designs at the time of this application have clear drawbacks in the 60 GHz unlicensed mmWave scenario. For example in these designs:
  the PUCCH bandwidth in initial access is always 1 PRB; and
  the PUCCH BW in initial access is always one interlace (10 PRBs) spread over 100 or 50 PRBs Both these options are suboptimal in the 60 GHz unlicensed scenario. PUCCH bandwidth of 1 PRB is seen to lack coverage (due to the PSD rule), while interlaced solution fragments spectrum unnecessarily in releases at the time of this application.

One core embodiment of the invention includes a method for guaranteeing coverage for PUCCH transmission (at least) in the case of initial access, i.e. before a UE has received a dedicated PUCCH configuration without fragmenting spectrum.

Before describing the example embodiments of the invention in further detail reference is made to FIG. 6. FIG. 6 shows a block diagram of one possible and non-limiting exemplary system in which the exemplary embodiments may be practiced.

As shown in FIG. 6, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a Determination module 140 which is configured to perform the example embodiments of the invention as described herein. The Determination module 150 may be implemented in hardware by itself of as part of the processors and/or the computer program code of the UE 110. The Determination module 140 comprising one of or both parts 140-1 and/or 140-2, which may be implemented in a number of ways. The Determination module 140 may be implemented in hardware as Determination module 140-1, such as being implemented as part of the one or more processors 120. The Determination module 140-1 may be implemented also as an integrated circuit or through other hardware such as a programmable gate array. In another example, the Determination module 140 may be implemented as Determination module 140-2, which is implemented as computer program code 123 and is executed by the one or more processors 120. Further, it is noted that the Determination modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a Determination module 150 which is configured to perform example embodiments of the invention as described herein. The Determination module 150 may comprise one of or both parts 150-1 and/or 150-2, which may be implemented in a number of ways. The Determination module 150 may be implemented in hardware by itself or as part of the processors and/or the computer program code of the gNB 170. Determination module 150-1, such as being implemented as part of the one or more processors 152. The Determination module 150-1 may be implemented also as an integrated circuit or through other hardware such as a programmable gate array. In another example, the Determination module 150 may be implemented as Determination module 150-2, which is implemented as computer program code 153 and is executed by the one or more processors 152. Further, it is noted that the Determination modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF 190. The link 131 may be implemented as, e.g., an S1 interface. The NCE/MME/SGW/UDM/PCF/AMM/SMF 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF 190 to perform one or more operations. In addition, the NCE/MME/SGW/UDM/PCF/AMM/SMF 190, as are the other devices, is equipped to perform operations of such as by controlling the UE 110 and/or gNB 170 for 5G and/or NR operations in addition to any other standards operations at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF 190 as in FIG. 6.

It is noted that functionality(ies), in accordance with example embodiments of the invention, of any devices as shown in FIG. 6 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 6 at least via the wireless link 111 and/or via the NCE/MME/SGW/UDM/PCF/AMM/SMF 190 using link 199 to Other Network(s)/Internet as in FIG. 6.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In accordance with example embodiments of the invention as at least described in the paragraphs above there are methods and an apparatus to include at least means for determining (one or more transceivers 130, Memory(ies) 125, Computer Program Code 123 and/or determination module 140-2, and Processor(s) 120 and/or Determination Module 140-1 as in FIG. 6), by a user equipment (UE 110 as in FIG. 6) of a communication network (Network 100 as in FIG. 6), information comprising a physical uplink control channel resource set allocation and an indication of subcarrier spacing used for a physical uplink control channel; means, based on the information, for determining (One or more transceivers 130, Memory(ies) 125, Computer Program Code 123 and/or determination module 140-2, and Processor(s) 120 and/or Determination Module 140-1 as in FIG. 6) at least one of a size or allocation of subcarrier spacing for the physical uplink control channel resource set allocation; and means for transmitting (One or more transceivers 130, Memory(ies) 125, Computer Program Code 123 and/or determination module 140-2, and Processor(s) 120 and/or Determination Module 140-1 as in FIG. 6) information associated with the physical uplink control channel to the communication network using at least the determined at least one size and allocation of the one or more physical uplink control channel resources.

In the example aspect of the invention according to the paragraph above, wherein at least the means for determining and transmitting comprises a non-transitory computer readable medium [Memory(ies) 125 as in FIG. 6] encoded with a computer program [Computer Program Code 123 and/or Determination module 140-2 as in FIG. 6] executable by at least one processor [Processor(s) 120 and/or Determination Module 140-1 as in FIG. 6].

As similarly mentioned above one embodiment of the invention includes a method for guaranteeing coverage for PUCCH transmission (at least) in the case of initial access, i.e. before a UE has received a dedicated PUCCH configuration.

In addition, certain important aspects may be seen as follows:

The PUCCH resource space in frequency/time is made configurable by system information, and determined in frequency/time by means of "nominal resource size in frequency (Hz)":

"Nominal resource size in frequency (Hz)" corresponds to a number of full PRBs with a nominal subcarrier spacing (SCS_nominal);

The PUCCH resource allocation (including one or more of the following properties: number of PRBs, PRB offset, PRB allocation, number of symbols) within the configured resource space is scaled proportionally to subcarrier spacing, or the ratio of nominal subcarrier spacing and the actual subcarrier spacing, such that similar coverage or transmission power can be maintained irrespective of the SCS being used for PUCCH transmission;

The scaling factor (in frequency) can be explicitly signaled, or determined based on the SCS or EIRP e.g. as:

SCS: scaling_factor=SCS_nominal/SCS_actual, where:

SCS_nominal is the SCS used to determine the nominal resource space in frequency. It is e.g.:

a largest subcarrier spacing supported in the specifications for 60 GHz band, such as 960, 1920, or 3840 kHz.

Alternatively, SCS_nominal could be also the smallest SCS supported for 60 GHz band, such as 60 or 120 kHz, In case the number of PRBs calculated based on the scaling_factor is non-integer (i.e. a fraction of a PRB), the actual number of PRBs could be rounded to nearest non-zero integer number of PRBs (e.g. ½ becomes 1), and SCS_actual is the subcarrier spacing applied in the active BWP of a PUCCH cell;

EIRP:

gNB signals to the UE the targeted maximum EIRP for PUCCH (EIRP_max, PUCCH),

If (EIRP_max, UE)<(EIRP_max, PUCCH), then additional_scaling_factor is determined to compensate for the difference:

E.g. additional_scaling_factor=power(10; ceil (((EIRP_max, PUCCH)−(EIRP_max, UE))/ 10)), and (EIRP_max, UE) is the maximum EIRP (dBm) the UE is capable of transmitting, or the min. peak EIRP (dBm) for the UE power class determined for the 60 GHz band.

In an example embodiment of the invention, the scaling is applied on top of parameters of standards at the time of this application. For example:
- Certain parameters of the PUCCH, such as number of PRBs, number of symbols, length of the Zhadoff-Chu sequence, PRB offset, etc. are multiplied by the scaling factor when the PUCCH is transmitted on a predetermined (60 GHz) band, and
- In one embodiment, the scaling is only applied for some of the entries, such as of a standards Table at the time of this application, when the PUCCH is transmitted on a predetermined (60 GHz) band:
  - e.g., the scaling only applies for certain PUCCH durations and/or formats, such as the PUCCH durations of 14 symbols (index #11 ... #15), i.e. those with the largest coverage, e.g., in standards releases at the time of this application.

In an example embodiment of the invention, the scaling can be applied both in time and in frequency, such that:
- Entries with less than 14 symbols are firstly extended in time, and only secondly in frequency, or
- alternatively scaling in frequency domain (based on the SCS) is done first. If the EIRP is limited by the (EIRP_max, UE) (and not by TPC or EIRP_max, PUCCH), the PUCCH transmission is extended in time by additional_scaling_factor
  - The (time-) extended PUCCH transmission may occur in the next slot, or in a slot that is a configured offset apart;
- In some embodiments the scaling can be quantized to a certain granularity (e.g. multiples of PRBs and/or symbols), in order to minimize the number of sequences (e.g. Zadoff-Chu sequences or orthogonal cover codes)). Further repetition of the same sequence may be applied to achieve multiples of a granularity. Another alternative is to determine a corresponding long sequence or use DFT-S-OFDMA DMRS sequence of the corresponding length.

IMPLEMENTATION EXAMPLES

FIG. 1 shows and example of how the PUCCH resource size scales proportionally to the subcarrier spacing. It assumes that the resource size is a multiple of PRBs with the smallest subcarrier spacing (120 kHz), e.g., 12*120 kHz=1.44 MHz.

FIG. 2 shows an example of PUCCH resource size indication using explicit signaling (3 bits, corresponding to values 0 ... 7). As shown in FIG. 2 there is an indication column 210 and a PUCCH resource size (MHz) column 220.

As shown in FIG. 1 there is PUCCH Resource sizes 110 in MHz, and number of PRBs for different PUCCH numerologies 120. As can be seen with FIG. 1 it is:
- As shown in 120 of FIG. 1 it is assumed SCS_nominal=3840 kHz and SCS_actual=120 kHz,
- Hence scaling_factor=32 (3840/120). This means that the PUCCH BW (in PRBs) for 120 kHz SCS is 32 times that of 3840 kHz SCS,
- The number of PRBs for each SCS may be tabulated as shown in FIG. 1
  - note that the entries for 3840 kHz with a fraction of a PRB (in grey) are only used for calculating the number of PUCCH PRBs for lower SCS, and
  - The minimum frequency domain allocation granularity of PUCCH is in any case 1 full PRB, i.e. fractional PRB allocations are rounded to the closest non-zero integer;

The UE may determine the absolute PUCCH resource size (rows in the table, in terms of MHz) based on:
- higher layer signaling (system information, e.g. on Remaining Minimum System Information), e.g. as shown in FIG. 2, where the indication 0 ... 7 indicates the PUCCH resource size in MHz (and equivalently, the row in the table of FIG. 1),
- alternatively, the PUCCH resource size used may be associated with an indicated row/index such as indicated by a "PUCCH-Resource-Common" indication in System Information Block 1, when the PUCCH is transmitted on a predetermined (60 GHz) band, and
- the PUCCH resource size may be derived based on another system parameter (e.g. PRACH format, used subcarrier spacing, and/or implicit signaling).

FIG. 3 shows a Time-first Frequency-second scaling for entry 4 in a Table. As shown in FIG. 3 there is a PUCCH resource size indication column 310, a Number of PRBs and Symbols for different PUCCH numerologies (kHz) column 330, which includes a number 3840 column 335, corresponding to the subcarrier spacing of 3840 kHz.

As shown in FIG. 3 there is an example of scaling based on time-first frequency-second principle. For example, taking entry 6 (4 symbol PUCCH resource with the nominal SCS of 3840 kHz) as a starting point, the PUCCH resource size would be doubled first in time domain (e.g. for 'PUCCH resource size indication'=6, the number of symbols increases from 4 to 8 when moving from 3840 kHz SCS to 1920 kHz SCS), and remaining scaling would be in PRB dimension as was the case in FIG. 1. This scaling solution would reach equivalent coverage compared to the example in FIG. 1.

FIG. 4 shows an example of scaling based on frequency-first time-second principle. As shown in FIG. 4 there is a minimum peak EIRP of UE column 410, and a number of PRBs and slots for different PUCCH numerologies (kHz). With regards to FIG. 4 there is:
- An example PSD limit of 13 dBm/MHz and EIRP_max_PUCCH=25 dBm, as well as indication of PUCCH resource set of #14 (with 14 symbol PUCCH) are assumed, and
- Additionally, it is assumed that SCS_nominal is the smallest supported SCS of 120 kHz (differently compared to the examples discussed in FIGS. 1 and 3 and that 12 PRBs are associated with the PUCCH resource set of the entry #14 in a table associated with standards at a time of this application, such as when used on 60 GHz band.

A UE with min peak EIRP larger than 25 dBm can transmit PUCCH at the targeted EIRP (at least on the main beam of transmission panel(s).) However, another UE with min peak EIRP of e.g. 23 dBm cannot reach the targeted value. Instead, the latter UE will transmit the PUCCH in two consecutive slots.

In standards at the time of this application, a UE determines the PRB index or PRB allocation for PUCCH transmission (in $1^{st}$ hop) e.g. as $RB_{BWP}^{offset}+\lfloor r_{PUCCH}/N_{CS}\rfloor$, where $RB_{BWP}^{offset}$ is the offset given by a Table regarding standards at the time of this application $N_{CS}$ is the number of initial cyclic shift indexes, and $r_{PUCCH}$ is the PUCCH resource index determined based on the PRI and the first CCE index of the PDCCH scheduling the PDSCH. With the proposed scaling by a scaling factor $f_s$, the PRB index of the first PRB of allocated PRBs could be determined, for example as $f_s \cdot RB_{BWP}^{offset}+f_s \cdot \lfloor r_{PUCCH}/N_{CS}\rfloor$.

Figure 7:
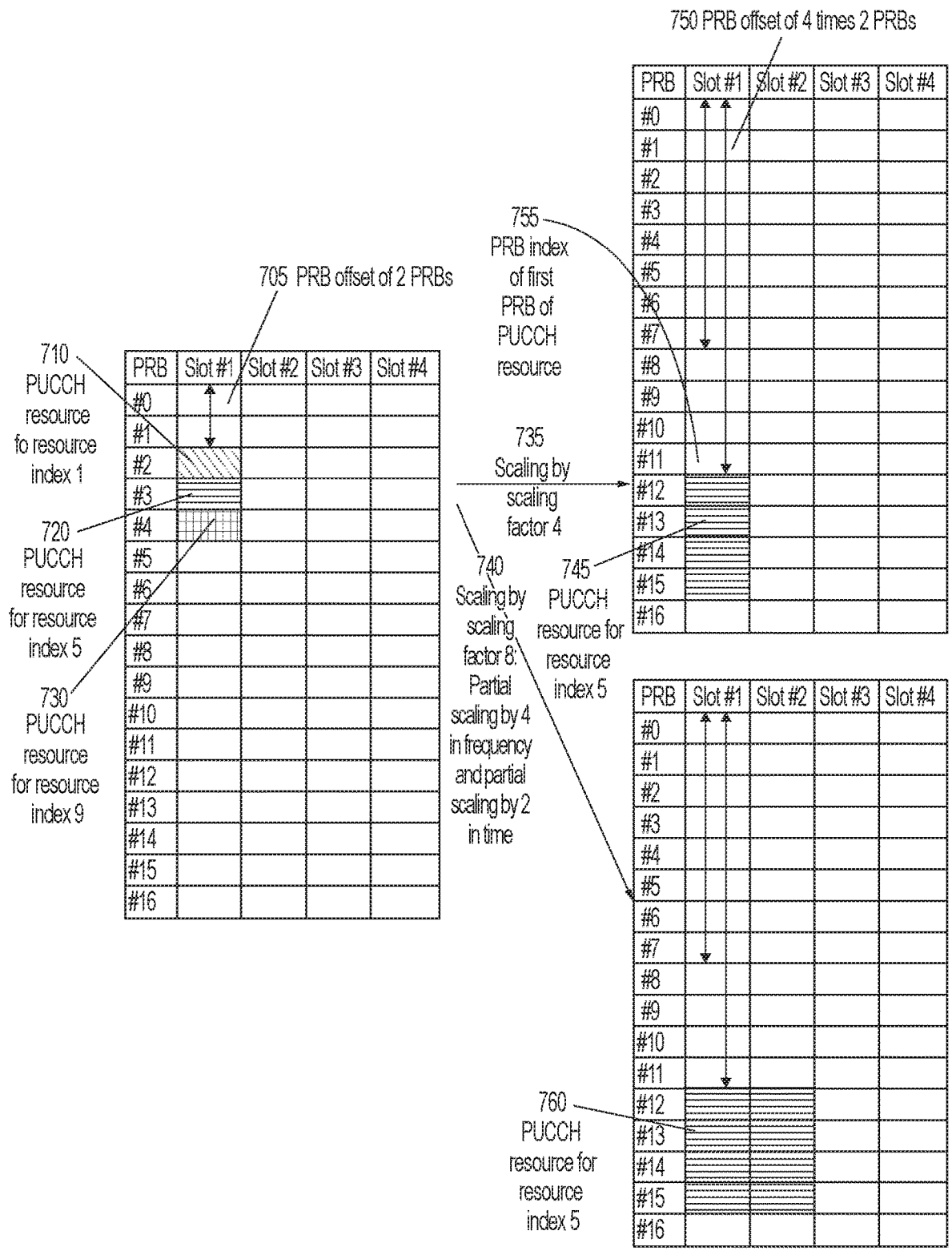
FIG. 7 shows example scaling operation in accordance with example embodiments of the invention.

FIG. 7 shows example scaling operation in accordance with example embodiments of the invention. As shown on left side of FIG. 7 there is shown an example for 3 nominal PUCCH resources. In accordance with an example embodiment of the invention this example may be applied to a nominal subcarrier spacing, for example a spacing of 3840 kHz. The shown nominal PUCCH resources are from nominal PUCCH resource set of index 13. The shown nominal PUCCH resources correspond for example to a PUCCH resource for resource index 1 710, a PUCCH resource for resource index 5 720, and a PUCCH resource for resource index 9 730 as shown in FIG. 7. As code division multiplexing is applied, the resource indexes 2, 3, and 4 indicate also PUCCH resource 710, and the resource indexes 6, 7, and 8 indicate also PUCCH resource 720, and so forth. The nominal PUCCH resource has duration of 14 symbols, i.e., one slot. PRB offset of 2 PRBs 705 as shown in FIG. 7 is used in the determination of nominal PUCCH resource allocation.

On upper right side of FIG. 7 an example of PUCCH resource corresponding to PUCCH resource index 5 745 of PUCCH resource set of index 13 is shown. The PUCCH resource is determined based on scaling factor of 4 735 as shown in FIG. 7. The scaling factor may be determined as ratio of 3820 kHz nominal subcarrier spacing and 480 kHz subcarrier spacing. The scaling is applied in frequency. As shown in FIG. 7, scaling factor of 4 scales the number of PRBs (1 PRB), PRB offset (2 PRB) of PUCCH resource 720 resulting into 4 PRB PUCCH resource 745 with PRB offset of 8 PRB and further shift of 4 PRBs reserving space for previous PUCCH resource (scaled PUCCH resource 710). As the PRB allocation of PUCCH resource can be determined by the number of PRBs as well as PRB index of the first PRB, the scaling factor scales also the PRB allocation of the PUCCH resource.

On the lower right side of FIG. 7 there is shown another example of PUCCH resource corresponding to PUCCH resource index 5 760 of PUCCH resource set of index 13 is shown. The PUCCH resource is determined based on scaling factor of 8 740. The scaling factor may be determined based on ratio of subcarrier spacing and based on additional scaling factor. In accordance with example embodiments of the invention such subcarrier spacing can include one or more spacing's, and or example can include 3820 kHz nominal subcarrier spacing and/or 480 kHz subcarrier spacing.

Further, the additional scaling factor may be determined to compensate for the difference between the targeted maximum EIRP for PUCCH and the maximum EIRP the UE is capable of transmitting. The scaling is applied partially in frequency and partially in time. Due to partial scaling in time, the number of symbols of PUCCH resource are scaled from 14 to 28 symbols.

Figure 8A:
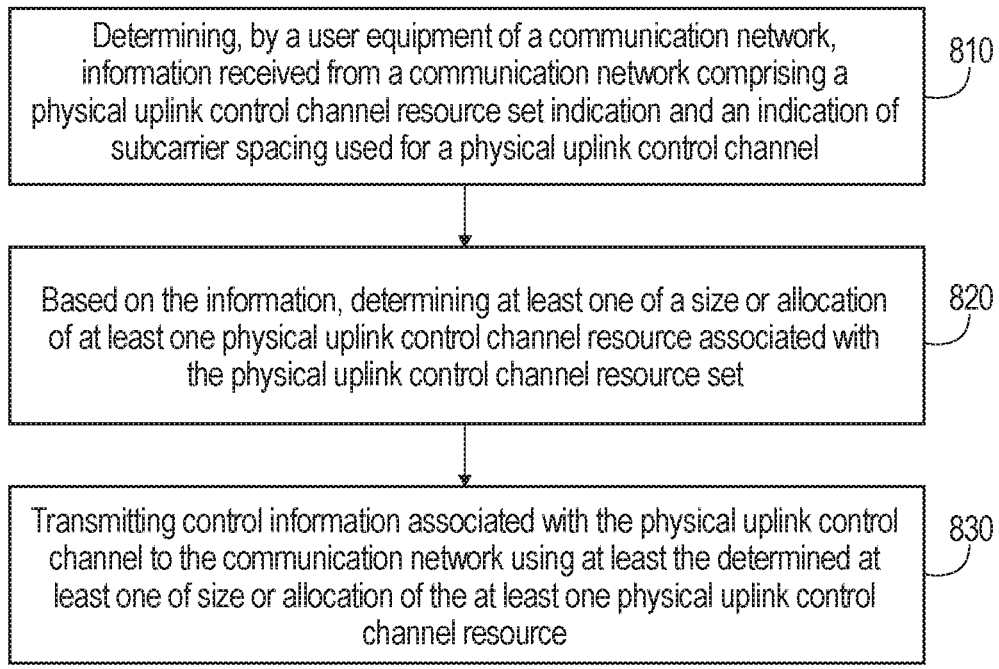
FIG. 8A and FIG. 8B each show a method which may be performed by an apparatus in accordance with example embodiments of the invention.

FIG. 8A shows a method which may be performed by an apparatus in accordance with example embodiments of the invention, such as by a UE 110 as in FIG. 6.

As shown in step 810 of FIG. 8A there is determining, by a user equipment of a communication network, information received from a communication network comprising a physical uplink control channel resource set indication and an indication of subcarrier spacing used for a physical uplink control channel. As shown in step 820 of FIG. 8A there is, based on the information, determining at least one of a size or allocation of at least one physical uplink control channel resource associated with the physical uplink control channel resource set. Then as shown in step 830 of FIG. 8A there is transmitting control information associated with the physical uplink control channel to the communication network using at least the determined at least one of size or allocation of the at least one physical uplink control channel resource.

In accordance with example embodiments of the invention as described in the paragraph above, wherein the at least one of a size or allocation of at least one physical uplink control channel resource associated with the physical uplink control channel resource set defines the nominal physical uplink control channel resource size in Hz or in physical resource blocks.

In accordance with example embodiments of the invention as described in the paragraph above, wherein the determining comprises determining a scaling factor for scaling the size of the at least one physical uplink control channel resource associated with the physical uplink control channel resource set in at least one of time and frequency.

In accordance with example embodiments of the invention as described in the paragraphs above, wherein the scaling factor is determined based at least on the indicated subcarrier spacing and a nominal subcarrier spacing.

In accordance with example embodiments of the invention as described in the paragraphs above there is, based on the scaling factor, determining at least two different resource size options for the at least one physical uplink control channel resource associated with the physical uplink control channel resource set.

In accordance with example embodiments of the invention as described in the paragraphs above, wherein the at least two different resource size options comprise a size option for at least one nominal physical uplink control channel resource.

In accordance with example embodiments of the invention as described in the paragraphs above, wherein the at least one nominal physical uplink control channel resource is associated with the nominal subcarrier spacing.

In accordance with example embodiments of the invention as described in the paragraphs above, wherein the at least one nominal physical uplink control channel resource covers a number of full physical resource blocks with the nominal subcarrier spacing.

In accordance with example embodiments of the invention as described in the paragraphs above there is, based on the scaling, rounding the size of the a least one physical uplink control channel resource into a predetermined granularity of at least one of symbols and physical resource blocks.

In accordance with example embodiments of the invention as described in the paragraphs above, wherein the at least one nominal physical uplink control channel resource size corresponds in frequency to a number of full physical resource blocks with a nominal subcarrier spacing for a physical uplink control channel.

In accordance with example embodiments of the invention as described in the paragraphs above, comprising the scaling factor is applied, wherein the scaling factor is firstly applied at least partially in time and secondly applied at least partially in frequency.

In accordance with example embodiments of the invention as described in the paragraphs above, wherein the scaling factor as applied causes a physical uplink control channel resource allocation size to be firstly one of increased or decreased in a time domain.

In accordance with example embodiments of the invention as described in the paragraphs above, wherein determining the scaling factor comprises determining a target equivalent isotropic radiated transmit power for the user equipment.

In accordance with example embodiments of the invention as described in the paragraphs above, wherein the scaling factor is scaling at least one of: the number of physical resource blocks, a physical resource block offset, a physical resource block allocation, or a number of symbols associated with the signaling for the physical uplink control channel resource set allocation.

In accordance with example embodiments of the invention as described in the paragraphs above, wherein based on the transmitting being performed in an unlicensed band, the scaling factor is applied to different resource size options in the at least one of time or frequency of the at least one of a size or allocation of the physical uplink control channel resource.

In accordance with example embodiments of the invention as described in the paragraphs above, wherein the unlicensed band comprises a 60 GHz unlicensed spectrum band.

In accordance with example embodiments of the invention as described in the paragraphs above, wherein transmitting control information associated with the physical uplink control channel to the communication network relates to the initial access procedure.

In accordance with example embodiments of the invention as at least described in the paragraphs above there are means for determining (one or more transceivers 130, Memory(ies) 125, Computer Program Code 123 and/or determination module 140-2, and Processor(s) 120 and/or Determination Module 140-1 as in FIG. 6), by a user equipment (UE 110 as in FIG. 6) of a communication network (Network 100 as in FIG. 6), information received from a communication network comprising a physical uplink control channel resource set indication and an indication of subcarrier spacing used for a physical uplink control channel; means, based on the information, for determining (one or more transceivers 130, Memory(ies) 125, Computer Program Code 123 and/or determination module 140-2, and Processor(s) 120 and/or Determination Module 140-1 as in FIG. 6) at least one of a size or allocation of at least one physical uplink control channel resource associated with the physical uplink control channel resource set; and means for transmitting (one or more transceivers 130, Memory(ies) 125, Computer Program Code 123 and/or determination module 140-2, and Processor(s) 120 and/or Determination Module 140-1 as in FIG. 6) control information associated with the physical uplink control channel to the communication network using at least the determined at least one of size or allocation of the at least one physical uplink control channel resource.

In the example aspect of the invention according to the paragraph above, wherein at least the means for determining and transmitting comprises a non-transitory computer readable medium [Memory(ies) 125 as in FIG. 6] encoded with a computer program [Computer Program Code 123 and/or determination module 140-2 as in FIG. 6] executable by at least one processor [Processor(s) 120 and/or Determination Module 140-1 as in FIG. 6].

Figure 8B:
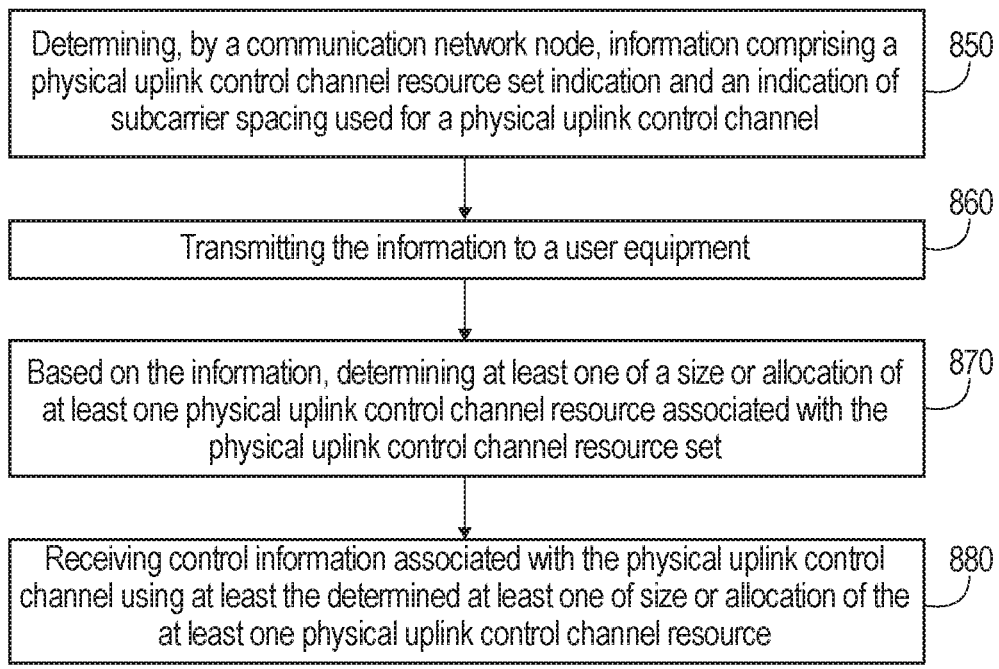

FIG. 8B shows a method which may be performed by an apparatus in accordance with example embodiments of the invention, such as by an eNB/gNB 170 as in FIG. 6. As shown in step 850 of FIG. 8B there is determining, by a communication network node, information comprising a physical uplink control channel resource set indication and an indication of subcarrier spacing used for a physical uplink control channel. As shown in step 860 of FIG. 8B there is transmitting the information to a user equipment. As shown in step 870 of FIG. 8B there is, based on the information, determining at least one of a size or allocation of at least one physical uplink control channel resource associated with the physical uplink control channel resource set. Then as shown in step 880 of FIG. 8B there is receiving control information associated with the physical uplink control channel using at least the determined at least one of size or allocation of the at least one physical uplink control channel resource.

In accordance with example embodiments of the invention as described in the paragraph above, wherein the at least one of a size or allocation of at least one physical uplink control channel resource associated with the physical uplink control channel resource set defines the nominal physical uplink control channel resource size in Hz or in physical resource blocks.

In accordance with example embodiments of the invention as described in the paragraphs above, wherein the determining comprises determining a scaling factor for scaling the size of the at least one physical uplink control channel resource associated with the physical uplink control channel resource set in at least one of time and frequency.

In accordance with example embodiments of the invention as described in the paragraphs above, wherein the scaling factor is determined based at least on the indicated subcarrier spacing and a nominal subcarrier spacing.

In accordance with example embodiments of the invention as described in the paragraphs above there is, based on the scaling factor, determining at least two different resource size options for the at least one physical uplink control channel resource associated with the physical uplink control channel resource set.

In accordance with example embodiments of the invention as described in the paragraphs above, wherein the at least two different resource size options comprise a size option for at least one nominal physical uplink control channel resource.

In accordance with example embodiments of the invention as described in the paragraphs above, wherein the at least one nominal physical uplink control channel resource is associated with the nominal subcarrier spacing.

In accordance with example embodiments of the invention as described in the paragraphs above, wherein the at least one nominal physical uplink control channel resource covers a number of full physical resource blocks with the nominal subcarrier spacing.

In accordance with example embodiments of the invention as described in the paragraphs above there is, based on the scaling, rounding the size of the a least one physical uplink control channel resource into a predetermined granularity of at least one of symbols and physical resource blocks.

In accordance with example embodiments of the invention as described in the paragraphs above, wherein the at least one nominal physical uplink control channel resource size corresponds in frequency to a number of full physical resource blocks with a nominal subcarrier spacing for a physical uplink control channel.

In accordance with example embodiments of the invention as described in the paragraphs above the scaling factor is applied, wherein the scaling factor is firstly applied at least partially in time and secondly applied at least partially in frequency.

In accordance with example embodiments of the invention as described in the paragraphs above, wherein the scaling factor as applied causes a physical uplink control channel resource allocation size to be firstly one of increased or decreased in a time domain.

In accordance with example embodiments of the invention as described in the paragraphs above, wherein determining the scaling factor comprises determining a target equivalent isotropic radiated transmit power for the user equipment.

In accordance with example embodiments of the invention as described in the paragraphs above, wherein the scaling factor is scaling at least one of: the number of physical resource blocks, a physical resource block offset, a physical resource block allocation, or a number of symbols associated with the physical uplink control channel resource set.

In accordance with example embodiments of the invention as described in the paragraphs above, wherein based on the transmitting, the scaling factor is applied to in an unlicensed band different resource size options in the at least one of time or frequency of the at least one of a size or allocation of the physical uplink control channel resource.

In accordance with example embodiments of the invention as described in the paragraphs above, wherein the unlicensed band comprises a 60 GHz unlicensed spectrum band.

In accordance with example embodiments of the invention as at least described in the paragraphs above there are means for determining (Remote radio head 195, Memory(ies) 155, Computer Program Code 153 and/or access module 150-2, and Processor(s) 152 and/or Access Module 150-1 as in FIG. 6), by a communication network node (eNB/gNB 170 as in FIG. 6), information comprising a physical uplink control channel resource set indication and an indication of subcarrier spacing used for a physical uplink control channel; means for transmitting (Remote radio head 195, Memory(ies) 155, Computer Program Code 153 and/or access module 150-2, and Processor(s) 152 and/or Access Module 150-1 as in FIG. 6) the information to a user equipment; means, based on the information, for determining (Remote radio head 195, Memory(ies) 155, Computer Program Code 153 and/or access module 150-2, and Processor(s) 152 and/or Access Module 150-1 as in FIG. 6) at least one of a size or allocation of at least one physical uplink control channel resource associated with the physical uplink control channel resource set; and means for receiving (Remote radio head 195, Memory(ies) 155, Computer Program Code 153 and/or access module 150-2, and Processor(s) 152 and/or Access Module 150-1 as in FIG. 6) control information associated with the physical uplink control channel using at least the determined at least one of size or allocation of the at least one physical uplink control channel resource.

In the example aspect of the invention according to the paragraph above, wherein at least the means for determining, receiving, and transmitting comprises a non-transitory computer readable medium [Memory(ies) 155 as in FIG. 6] encoded with a computer program [Computer Program Code 153 and/or Access Module 150-2 as in FIG. 6] executable by at least one processor [Processor(s) 152 and/or Access Module 150-1 as in FIG. 6].

Advantages of operations as disclosed herein in accordance with example embodiments of the invention include at least:
  Providing of guaranteed coverage or transmit power for PUCCH irrespective of the subcarrier spacing and/or UE specific EIRP limitations;
  Avoiding and/or minimizing a need for additional broadcast signaling;
  Support for a wide range of possible UE specific EIRP values in a resource efficient manner; and
  Scaling which can be used for example in particular regions with low PSD limit, such as for a non-limiting example in Korea with a PSD limit 10 dB lower than that in e.g. Europe.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
determining, by a user equipment of a communication network, information received from a communication network comprising a physical uplink control channel resource set indication and an indication of subcarrier spacing used for a physical uplink control channel;
based on the information, determining at least one of a size or allocation of at least one physical uplink control channel resource associated with the physical uplink control channel resource set; and
transmitting control information associated with the physical uplink control channel to the communication network using at least the determined at least one of size or allocation of the at least one physical uplink control channel resource;
wherein the determining comprises determining a scaling factor for scaling the size of the at least one physical uplink control channel resource associated with the physical uplink control channel resource set in at least one of time and frequency; and
wherein the scaling factor is determined based at least on the indicated subcarrier spacing and a nominal subcarrier spacing.

2. The method of claim 1, wherein the scaling factor is scaling at least one of:
the number of physical resource blocks,
a physical resource block offset,
a physical resource block allocation, or
a number of symbols associated with the physical uplink control channel resource set.

3. The method of claim 1, wherein determining the scaling factor comprises determining a target equivalent isotropic radiated transmit power for the user equipment.

4. The method of claim 1, comprising:
based on the scaling factor, determining at least two different resource size options for the at least one physical uplink control channel resource associated with the physical uplink control channel resource set.

5. The method of claim 4, wherein the at least two different resource size options comprise a size option for at least one nominal physical uplink control channel resource.

6. The method of claim 1, wherein based on the transmitting being performed in an unlicensed band, the scaling factor is applied to different resource size options in the at least one of time or frequency of the at least one of a size or allocation of the physical uplink control channel resource.

7. The method of claim 1, wherein transmitting control information associated with the physical uplink control channel to the communication network relates to an initial access procedure.

8. An apparatus, comprising:
one or more processors; and
one or more memories including computer program code, the one or more memories and the computer program code configured to, with the one or more processors, cause the apparatus to at least:
determine information received from a communication network comprising a physical uplink control channel resource set indication and an indication of subcarrier spacing used for a physical uplink control channel;
based on the information, determine at least one of a size or allocation of at least one physical uplink control channel resource associated with the physical uplink control channel resource set; and
transmit control information associated with the physical uplink control channel to the communication network using at least the determined at least one of size or allocation of the at least one physical uplink control channel resource;
wherein the determining comprises determining a scaling factor for scaling the size of the at least one physical uplink control channel resource associated with the physical uplink control channel resource set in at least one of time and frequency; and
wherein the scaling factor is determined based at least on the indicated subcarrier spacing and a nominal subcarrier spacing.

9. The apparatus of claim 8, wherein the scaling factor is scaling at least one of:
the number of physical resource blocks,
a physical resource block offset,
a physical resource block allocation, or
a number of symbols associated with the physical uplink control channel resource set.

10. The apparatus of claim 8, wherein determining the scaling factor comprises determining a target equivalent isotropic radiated transmit power for the apparatus.

11. The apparatus of claim 8, wherein the apparatus is further caused to:
based on the scaling factor, determine at least two different resource size options for the at least one physical uplink control channel resource associated with the physical uplink control channel resource set.

12. The apparatus of claim 11, wherein the at least two different resource size options comprise a size option for at least one nominal physical uplink control channel resource.

13. The apparatus of claim 12, wherein the at least one nominal physical uplink control channel resource size corresponds in frequency to a number of full physical resource blocks with a nominal subcarrier spacing for a physical uplink control channel.

14. The apparatus of claim 8, wherein based on the transmitting being performed in an unlicensed band, the scaling factor is applied to different resource size options in the at least one of time or frequency of the at least one of a size or allocation of the physical uplink control channel resource.

15. The apparatus of claim 8, wherein transmitting control information associated with the physical uplink control channel to the communication network relates to an initial access procedure.

* * * * *